May 24, 1938.                R. COLELL                2,118,341
COMBUSTION CHAMBER FOR INTERNAL COMBUSTION
ENGINES WITH IGNITION BY COMPRESSION
Filed Jan. 29, 1936

Inventor:
R. Colell
By E. H. Wendroth
Atty

Patented May 24, 1938

2,118,341

UNITED STATES PATENT OFFICE 2,118,341

COMBUSTION CHAMBER FOR INTERNAL COMBUSTION ENGINES WITH IGNITION BY COMPRESSION

Richard Colell, La Bergerie, Liancourt, France

Application January 29, 1936, Serial No. 61,436
In France February 14, 1935

2 Claims. (Cl. 123—32)

In internal combustion engines of the compression ignition type with a combustion chamber in which, at the end of the compression stroke, the whole or practically the whole of the air charge is compressed in the chamber, in which the fuel is injected into said chamber and in which said compression chamber is connected to the cylinder by a passage, the mixture of air and fuel being obtained by the formation of a swirl resulting from the shape of the chamber and from the direction of the air entering this chamber, it can be noted that the efficiency of the engine increases with the number of revolutions of the swirl. For obtaining the best possible efficiency, it is therefore necessary to increase as much as possible this number of revolutions of the swirl which is formed in the combustion chamber.

Up to now, one of the best methods for the formation of the swirl under consideration in the combustion chamber—this swirl being intended to promote the mixing of air and fuel—consisted in giving to said chamber a spherical or cylindrical shape and in giving to the passage connecting this chamber to the cylinder a direction internally tangent to the sphere or to the cylinder.

But this position of the connecting passage in relation to the spherical or cylindrical chamber is not the one which gives the best results as far as the angular speed of the swirl and, therefore, the efficiency of the engine are concerned.

The present invention relates to improvements in the combustion chambers of engines of the above type for the purpose of remedying the inconvenience mentioned above and for the purpose, consequently, of improving the efficiency of the internal combustion engine embodying the invention. This invention is essentially characterized by the fact that the connecting passage between the combustion chamber and the cylinder is tangent or substantially tangent, not to the interior of the sphere or cylinder forming the combustion chamber, but externally or substantially externally to said sphere or to said cylinder, and by the fact that, in vertical section, the outer wall of said passage is joined, to the circular section of the combustion chamber, by a curve approximating a spiral, the latter being practically an arc of circle tangent to the above circular section and approximating as much as possible the ideal spiral.

Figure 3:
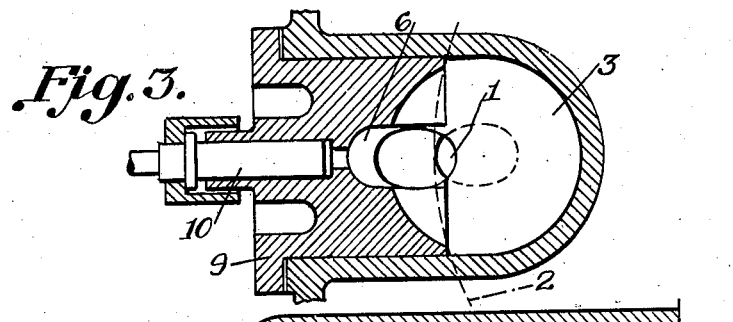
Figure 2 is a similar cross section of another modification of applicant's improved construction and Figure 3 is a horizontal sectional view of the construction shown in Figure 2.
Figure 2:
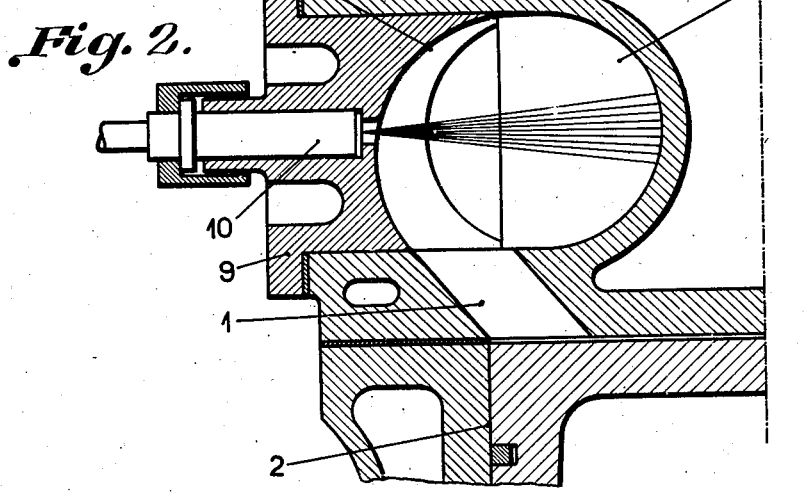
Figure 1:
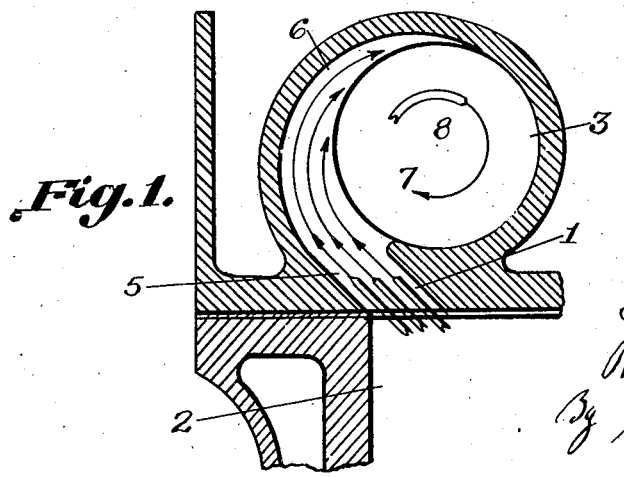
Figure 1 is a cross section of applicant's improved construction.

Two embodiments of the invention, which are given by way of examples only, are diagrammatically illustrated in vertical section in Figs. 1 and 2 of the accompanying drawing.

As shown in Fig. 1, the passage 1 connecting the cylinder 2 to the spherical or cylindrical combustion chamber 3 in which is formed the swirl intended to produce a suitable mixture of air and fuel is tangent to this chamber 3 (which is preferably of spherical shape, but might also be of cylindrical shape) externally. Moreover, the outer wall 5 of this connecting passage 1 instead of being directly joined to the sphere or to the cylinder 3, is joined to the circular section of the chamber 3 by a curve 6 approximating a spiral. It will be seen that, in these conditions, air entering through passage 1, into the combustion chamber does not intersect the swirl under an angle approximating 90°, but under extremely small angles, as clearly illustrated in Fig. 1. Consequently, with the improved chamber forming the subject-matter of the invention, the swirl which is formed in the combustion chamber 3 will no longer encounter any resistance due to the direction of the air entering the combustion chamber; this air will enter the swirl under extremely small angles and, consequently, it will not exert on said swirl any counter action. This swirl can thus attain its full speed, that is to say its maximum speed, and the efficiency of the engine will thereby be improved since its efficiency depends, to a great extent, on the angular speed of the swirl which is formed in the combustion chamber.

As stated in the foregoing, the ideal shape of the curve 6 would be a spiral, but such a shape would be difficult to machine; it is replaced in practice by a surface which, in vertical section, has the shape of an arc of circle tangent to the circular section of the combustion chamber 3, this arc of circle approximating as much as possible the ideal spiral; the center of this arc of circle will, for instance, be offset at 7 with relation to the center 8 of the circular section of the combustion chamber 3 and it will be tangent both to the circular section 3 and to the outer wall 5 of the connecting passage.

The connecting passage 1 between the combustion chamber and the cylinder 2 is not necessarily situated entirely outside the circular section of this chamber 3; it can be slightly offset inwardly, as in the case of Fig. 2. In this figure, is also shown in greater detail, but still in vertical section, the upper part of an engine of the type above mentioned and arranged according to the invention. In this Fig. 2, it will be seen, in particular, that the connecting surface 6 between the passage 1 and the spherical or cylindrical combustion chamber 3 is formed in a removable plug 9 which forms part of the combustion chamber and allows the machining of the spherical chamber and of the connection joining the passage 1 to this spherical chamber; in this plug might be arranged the fuel injector 10, but any other arrangement of the location of the injector can be adopted. As previously stated, the shape of the chamber 3 is, preferably, spherical, but it can also be cylindrical.

Although two embodiments of the invention have been described in the foregoing and illustrated in the drawing, it is obvious that said invention is applicable according to slightly different forms and that the constructional details can be modified without departing thereby from the scope of the invention.

What I claim is:

1. An internal combustion engine comprising a cylinder, a piston therein, a combustion chamber formed as a surface of revolution, a fuel injector therein, a passage connecting said cylinder to said chamber having an inner surface adjacent said combustion chamber and an outer surface spaced therefrom and said passage being tangential to the outer surface of said combustion chamber at both the inner and outer surfaces of said passage whereby the air current is projected tangentially into said chamber at both the inner and outer surfaces of said passage during the compression stroke of said piston.

2. An internal combustion engine comprising a cylinder, a piston therein, a substantially spherical combustion chamber, a fuel injector therein, a passage connecting said cylinder to said chamber having an inner surface adjacent said combustion chamber and an outer surface spaced therefrom and said passage being tangential to the outer surface of said combustion chamber at both the inner and outer surfaces of said passage whereby the air current is projected tangentially into said chamber at both the inner and outer surfaces of said passage during the compression stroke of said piston.

RICHARD COLELL.